United States Patent [19]
Miyazaki et al.

[11] Patent Number: 4,578,296
[45] Date of Patent: Mar. 25, 1986

[54] THERMOFORMED POLYOLEFIN CUP

[75] Inventors: Senji Miyazaki, Sodegaura; Osamu Touya, Kisarazu, both of Japan

[73] Assignee: Idemitsu Petrochemical Co., Ltd., Tokyo, Japan

[21] Appl. No.: 620,185

[22] Filed: Jun. 13, 1984

[30] Foreign Application Priority Data

| Jun. 28, 1983 | [JP] | Japan | 58-115153 |
| Jun. 28, 1983 | [JP] | Japan | 58-115154 |
| Jun. 28, 1983 | [JP] | Japan | 58-115155 |
| Feb. 17, 1984 | [JP] | Japan | 59-26961 |
| Feb. 17, 1984 | [JP] | Japan | 59-26962 |

[51] Int. Cl.$^4$ ............................................. B65D 5/00
[52] U.S. Cl. ................................... 428/35; 229/1.5 B; 428/516; 428/323; 428/328; 428/330
[58] Field of Search ............... 524/451; 428/35, 515, 428/516, 323, 328, 330, 331, 338, 523; 229/1.5 B

[56] References Cited

U.S. PATENT DOCUMENTS

| 4,052,037 | 10/1977 | Mair et al. | 229/1.5 B |
| 4,101,050 | 7/1978 | Buckler et al. | 524/451 |
| 4,124,562 | 11/1978 | Yui et al. | 524/451 |
| 4,211,690 | 7/1980 | Asano et al. | 524/451 |
| 4,309,333 | 1/1982 | Silberberg | 524/451 |
| 4,368,818 | 1/1983 | Day et al. | 229/1.5 B |
| 4,447,479 | 5/1984 | Harrison et al. | 428/35 |

FOREIGN PATENT DOCUMENTS

| 0120642 | 9/1980 | Japan | 524/451 |
| 6109235 | 8/1981 | Japan | 524/451 |
| 0047240 | 3/1984 | Japan | 524/451 |

Primary Examiner—John E. Kittle
Assistant Examiner—James J. Seidleck
Attorney, Agent, or Firm—Frishauf, Holtz, Goodman & Woodward

[57] ABSTRACT

The present invention relates to a cup which is produced by thermoforming a polyolefin resin composition sheet wherein the polyolefin resin composition comprises from 30 to 80% by weight of a polyolefin resin, from 19 to 69% by weight of talc, and from 1 to 10% by weight of titanium oxide, and also by thermoforming of a laminated sheet comprising (A) a layer of the above described polyolefin resin composition and (B) a layer of a polyolefin resin composition containing from 0 to 10% by weight of an inorganic filler.

The cup is of high whiteness, and has a high quality paper-like appearance of reduced luster and transparency impression, and is high in strength, stiffness, stability, and so forth.

20 Claims, 6 Drawing Figures

THERMOFORMED POLYOLEFIN CUP

BACKGROUND OF THE INVENTION

The present invention relates to an improved cup. More particularly, it is concerned with a cup which is of high whiteness, has a high quality paper-like appearance of reduced luster and transparency impression, is high in strength, stiffness, heat resistance, and stability, and furthermore which is greatly improved in disposability and ease of disposal by burning.

Disposable cup such as food cups and drink cups, particularly those for use in a vending machine and a picnic have heretofore been made of paper, synthetic resins, or laminated paper.

Cups made of paper are light-weight and are easy to dispose by burning but have disadvantages in that water resistance is inferior, productivity is low because they require a bonding step in the production thereof, and furthermore in that the choice of a suitable adhesive is limited by its toxicity; that is, an adhesive to be used should be selected taking into consideration safety for handling or hygienic packaging.

For this reason, laminated paper prepared by coating or laminating synthetic resin films or paper are used. Cups made of these laminated paper are improved in water resistance to some extent but cannot be said to have been substantially improved because they are not made in one body; that is, they have bonded sections. Since the process of production of these cups are substantially the same as for production of paper cups except that paper is replaced by laminated paper, productivity is low, leading to an increase in production cost.

Cups made of paper or laminated paper can be produced only in relatively simple forms such as in a form circular or square in cross section because of the characteristics of paper. Moreover, since they cannot be molded in one body, it is inevitably necessary to bond together parts in the fabrication thereof. When they are used in a vending machine, they do not always drop in completely the same manner because of irregularities due to bonded areas and of light-weight. That is, irregular dropping is liable to occur, causing problems and, therefore, severe quality control is needed in the fabrication of the cups. In the case of printed cups, a problem arises in that the print is deviated in bonded areas.

In recent years, therefore, cups made of synthetic resin sheets by thermoforming have begun to be used. These cups are not sufficiently satisfactory in heat resistance and stiffness although they are superior in thermoformability, light-weight, sanitariness, and so forth. In connection with the appearance, they have luster characteristic of synthetic resins, and they are inferior in opacifying properties, printing properties, and so forth. Thus, there has not been obtained a cup which gives a high quality impression as in paper cups. These cups made of synthetic resin sheets cannot be collapsed and become very bulky in the disposal thereof. Moreover, the calorific value of such cups made of synthetic resin sheets is much greater than that of paper. Thus, in disposal by burning, they damage the walls of a incinerator and cause melting and solidification. Depending on the type of resins used, they produce poisonous gases and black smoke, causing serious social problems in their disposal.

In order to overcome the above-described problems, an attempt has been made to produce cups by using a procedure which involves compounding an inorganic filler to a polyolefin resin, melt-kneading the resulting mixture, molding it into a sheet by the calendering process or extrusion molding process, and subjecting the sheet to fabrication such as vacuum molding and/or pressure molding. These cups are relatively high in stiffness and heat resistance and also are superior from a viewpoint of prevention of pollution in that they have low calorific values, do not cause melting and solidification, and in that they do not produce black smoke. Furthermore, addition of such inorganic fillers reduces the amount of synthetic resins used. Thus, these cups are expected to be in widespread use.

Cups produced by thermoforming, however, are relatively low in whiteness and, because of their characteristic luster, inevitably give a strong impression that they are made of synthetic resins. Particularly, in the case of thin wall cups measuring 1 mm or less in thickness, the transparency impression remains and the appearance is not sufficiently satisfactory. That is to say, such cups do not give a high quality impression as in paper cups. In the case of cups produced using calcium carbonate, which is the most commonly used inorganic filler, the problem that calcium carbonate elute from the cups arises. Thus these cups are not suitable for use as food cups. In practice, therefore, cups made of inorganic filler-compounded polyolefins are not used at all in the field of drink cups although they have superior characteristics and high productivity.

In producing cups by thermoforming, such as vacuum forming, of sheets of thermoplastic resin compositions in which an inorganic filler is compounded in a relatively large amount, the formation of irregularities in the surface of the sheets due to extrusion at the time of production of sheets occurs and deep draw forming is difficult. In particular, when thermoforming is performed at relatively low temperatures, the inorganic filler contained elute to the surface of the cup, reducing surface characteristics. When the cups surface is printed, particularly when a cup which is circular in cross section is subjected to high-speed and continuous printing by the use of a curved surface printing machine, the inorganic filler solving out of the cup is transferred to the blanket part coming into contact with the cup. With a lapse of time, the thus-transferred inorganic filler moves to rollers and ink, making it impossible to produce beautiful prints stably over long periods of time. Depending on the purpose for which the cup is used, the inorganic filler and other additives are dissolved in the contents such as drinks. In the case of a cup for soft drinks, carbon dioxide gas is lost with a lapse of time, resulting in a reduction in flavor.

SUMMARY OF THE INVENTION

The present invention is intended to overcome the above-described problems of the prior art, and the object of the present invention is to provide a cup which is free from the problems described.

The present invention, an embodiment relates to a cup which is produced by thermoforming a polyolefin resin composition sheet wherein the polyolefin resin composition comprises 30 to 80% by weight of a polyolefin resin, 19 to 69% by weight of talc, and 1 to 10% by weight of titanium oxide.

In another embodiment, the present invention relates to a cup which is produced by thermoforming of a laminated sheet comprising (A) a layer of a polyolefin resin composition comprising 30 to 80% by weight of a polyolefin resin, 19 to 69% by weight of talc, and 1 to 10% by weight of titanium oxide, and (B) a layer of a polyolefin resin composition containing 0 to 10% by weight of an inorganic filler.

BRIEF DESCRIPTION OF THE DRAWINGS

FIG. 5 shows different shapes of curl; and

DETAILED DESCRIPTION OF THE INVENTION

There is no limitation on the polyolefin resin as used herein; various types of polyolefin resins can be used, including a polyethylene resin, a polypropylene resin, and a polybutene resin.

The polypropylene resin includes a propylene homopolymer, block or random copolymers of propylene and 30% by weight or less of other α-olefins such as ethylene, and mixtures thereof. The melt index of the polypropylene resin is usually from 0.1 to 5 grams per 10 minutes, preferably from 0.2 to 3 grams per 10 minutes, and more preferably from 0.3 to 1.5 grams per 10 minutes. If the melt index is in excess of 5 grams per 10 minutes, the melt strength of the resulting sheet is low. On the other hand, if it is less than 0.1 gram per 10 minutes, fluidity is low, uniform kneadability with talc and titanium oxide is poor, and thermoforming becomes difficult. The polypropylene resin can be selected appropriately taking into consideration the amount of the inorganic filler, the size of the cup, required properties such as heat resistance, stiffness, cold resistance, and so forth.

The polyethylene resin includes various types of resins, such as high density polyethylene, intermediate density polyethylene, and low density polyethylene. As well as an ethylene homopolymer, random or block copolymers of ethylene and 30% by weight or less of other α-olefins such as propylene can be used. The high density polyethylene has a density ranging between 0.940 and 0.970 gram per cubic centimeter. The intermediate density and low density polyethylenes include high pressure-processed polyethylene and so-called linear low density polyethylenes (LLDPE) such as copolymers of ethylene and α-olefins having from 3 to 12 carbon atoms, such as propylene, butene-1,4-methylpentene-1, and octene-1, as produced by the intermediate or low pressure process. The melt index of the polyethylene resin is usually from 0.02 to 10.0 grams per 10 minutes, preferably from 0.03 to 5.0 grams per 10 minutes, and more preferably from 0.04 to 2.0 grams per 10 minutes. If the melt index of the polyethylene resin is not within the above-specified range, sheet formability and thermoformability is not satisfactory.

The polyolefin resin as used herein may be one of the polypropylene resin, the polyethylene resin, the polybutene resin, and so forth as described above, or a mixture of two or more thereof. In continuous and mass production of cups of deep forming and more light-weight, by thermoforming such as vacuum forming, it is favorable to use a mixture of the polypropylene resin and polyethylene resin as described above. In preparing this mixture, the ratio of the polypropylene resin to the polyethylene resin is not critical. In general, the weight ratio of the polypropylene resin to the polyethylene resin is from 9:1 to 1:9 and preferably from 7:3 to 3:7.

The polyolefin resin in the polyolefin resin composition of the present invention is used in an amount of from 30 to 80% by weight based on the total weight of the polyolefin resin composition, with the range of from 40 to 75% by weight being preferred.

Of various types of polyolefin resins as described above, the optimum one is selected depending on the amounts of talc and titanium oxide as described hereinafter, the use, size, depth, form and a method of forming of the cup, and so forth. In this case, two or more of different polyolefin resins in respect of the type and grade may be used in combination with each other.

The talc as used herein is not limited in type, shape, size and so forth. Usually it is hydrated magnesium silicate having an average grain size of from 5 to 30 microns, preferably from 10 to 20 microns, and comprising 50 to 65% $SiO_2$, 25 to 40% $MgO$, the balance being other constituents. Furthermore, the ignition loss is 1% or less. The amount of talc added varies depending on the shape of the cup, the type. However, the amount of talc added is from 19 to 69% by weight, preferably from 25 to 60% by weight based on the total weight of the polyolefin resin composition. If the amount of talc added is too large, although stiffness and ease of disposal by burning are increased, sheet formability or thermoformability is reduced.

As described above, various types of talc can be used in the present invention. When the cup of the present invention is used as a cup for foodstuffs, for example, it is preferred to use talc which does not elute from the cup and also does not have odor. In addition, talc which is highly purified or is freed of impurities by application of acid treatment can be used. it is not required for the talc as used herein to be subjected to additional treatments such as a surface treatment. In cases, however, where a high mechanical strength is required, for example, when the cup of the present invention is used to contain products other than foodstuffs, there may be used talc with the surface subjected to a treatment to make it lipophilic. A typical example of this treatment is to introduce surface active agents having a lipophilic group, polymerizable monomers forming a lipophilic group on reacting when heated, or silane-based coupling agents.

In addition to the above-described constituents, the polyolefin resin composition of the present invention contains titanium oxide. The term "titanium oxide" is used herein to mean usually titanium dioxide ($TiO_2$). Of course, titanium dioxide containing minor proportions of titanium monoxide (TiO) and dititanium trioxide ($Ti_2O_3$) can be used. There is no limitation on the shape, for example, of titanium oxide. In general, the titanium oxide as used herein is in a granular, powdery or like shape having an average grain size of from about 0.05 to 2 microns, preferably from about 0.1 to 1 micron. The amount of titanium oxide compounded varies depending on various conditions. It is preferred for titanium oxide to be used in such an amount that when a sheet is formed using the resulting composition, the total transmittance of the sheet is 3% or less, especially 2% or less. More specifically, titanium oxide is used in an amount of from 1 to 10% by weight, preferably from 1.5 to 8% by weight based on the total weight of the polyolefin resin composition.

In conventional cups, when titanium oxide is compounded, it is added in a small amount; usually it is used in an amount of 0.5% by weight or less based on the total weight of the composition. In contrast, a relatively large amount of titanium oxide is used in the present invention and, furthermore, in combination with talc. In this respect, the polyolefin resin composition of the present invention is materially different from conventional ones.

The polyolefin resin composition for use in the production of the cup of the present invention comprises essentially the three components: polyolefin resin, talc, and titanium oxide. If necessary, the polyolefin resin composition can contain rubbers such as an ethylene/propylene rubber, and an ethylene/propylene/diene rubber, polyolefin resins modified with unsaturated carboxylic acids, such as maleic anhydride, or their derivatives, and so forth. In addition, various additives such as antioxidants, ultraviolet absorbers, antistatic agents, lubricants, and pigments can be added.

The polyolefin resin composition is formed into a sheet and thereafter into a predetermined shape by thermoforming to produce the cup of the present invention. That is, the above-described three components and other desired constituents are thoroughly kneaded by known techniques such as with rolls or in a Banbury mixer, a monoscrew extruder, or a multi-screw extruder and, thereafter, formed into a sheet by techniques such as the sheet extrusion process and the calender roll process. The thickness of the sheet is usually from 0.2 to 3 millimeters.

The thus-produced sheet is shaped into the desired cup by applying thermoforming such as vacuum forming, pressure forming or a combination thereof. By employing this forming process, a plurality of cups can be produced at the same time. That is, the forming cycle is short and mass production can be performed continuously.

In the cup of the present invention as produced above, the whiteness degree of a major portion of the external surface is 90% or more and preferably 92% or more. The glossiness (GS (60°)) as determined according to ASTM D523 is 10% or less and preferably 8% or less. The total transmittance as determined according to ASTM D1003 is 5% or less.

The cup of the present invention can be obtained in various shapes. Although there is no limitation on the shape of the cup of the present invention, when it is used as a drink cup, it is preferred that the ratio of height to average diameter or average edge length be from 1.1:1 to 2.0:1, the range of from 1.2:1 to 1.7:1 being particularly preferred. The reason why the average value is employed for the diameter or edge length of the cup is that as in drink cups, for example, the diameter of the bottom is sometimes different from that of the open end. The cross section of the cup of the present invention may take various shapes; that is, the cup may be not only circular or polygonal but also oval in cross section.

The cup of the present invention is obtained by thermoforming of a sheet of the polyolefin resin composition comprising the polyolefin resin, talc, and titanium oxide as described above. Melt kneadability does not cause a problem, the melt strength is satisfactorily high, and cups of deep form can be obtained. There can therefore be obtained elongated cups with the ratio of height to average diameter or average edge length falling within the above-described range, which are suitable for use as drink cups.

Figure 1:
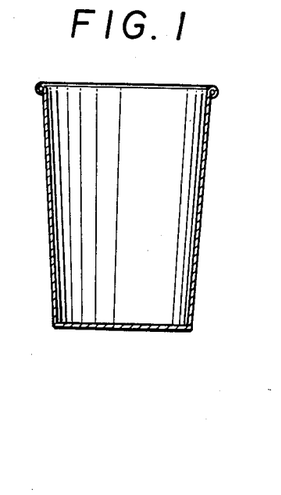
FIG. 1 is a cross-sectional view of an embodiment of the cup of the present invention.

Referring to FIG. 1, there is shown a cross sectional view of an embodiment of the cup of the present invention. In producing a drink cup of the type of FIG. 1, a curling portion 1 can be easily formed by subjecting the periphery of the open top end of the cup to a curling treatment. Provision of this curling portion 1 makes the cup more preferred as a drink cup. The shape of this drink cup is not critical as long as the height/average diameter ratio falls within the above-specified range. For example, the cross section of the cup may be made gradually greater from the bottom to the top open end. Moreover, an undercut 2 may be provided in the periphery of the bottom of the cup in order to form a stack. In this case, it is suitable for the height of the undercut to be from 3 to 10 millimeters.

The cup of the present invention have various superior characteristics. Some of the superior characteristics are shown below.

(1) It is of high whiteness and does not have luster and, furthermore, since the plastic impression is removed because of its high opacifying properties, it exhibits a high quality appearance.
(2) Not only the appearance but also the touch and the feeling of use when it is tapped are similar to those of a high quality paper-made cup.
(3) It is high in strength, stiffness, heat resistance, and water resistance.
(4) It is odorless and, furthermore, is of high safety in that the filler is not dissolved out.
(5) Printing and coating properties are good.
(6) Because of suitable foaming properties, it is suitable as a cup for beer and soft drinks.
(7) When collapsed with high power, it is easily deformed or broken and, furthermore, it does not restore to the original shape under the action of elastic recovery. Thus it does not increase the amount of waste and is easy to dispose.
(8) The calorific value is low. Thus it does not damage the walls of a incinerator and, furthermore, does not cause melting and solidification and also does not produce poisonous gases and black smoke. Thus it is superior in ease of disposal by burning.
(9) The forming cycle is short, and mass production can be performed continuously.
(10) When superposed on one another, they do not stick to others. Thus, when used in a vending machine, they are satisfactory in stack properties and dropping characteristics.

Thus the cup of the present invention is useful as a cup for wrapping various products, for foodstuffs, or for drinks.

In another embodiment, the present invention is concerned with a cup which is produced by thermoforming of a laminated sheet comprising:
(A) a layer of a polyolefin resin composition comprising 30 to 80% by weight of a polyolefin resin, 19 to 69% by weight of talc, and 1 to 10% by weight of titanium oxide; and
(B) a layer of a polyolefin resin composition containing 0 to 10% by weight of an inorganic filler.

The polyolefin resin composition used in the preparation of the layer (A) is the same as used in the above-described embodiment. Therefore, only the polyolefin resin composition for use in the preparation of the layer (B) will hereinafter be explained in detail.

There is no limitation to the polyolefin resin for the layer (B), and those resins described in the first embodiment can be used. The polyolefin resin of the layer (B) may be different from that of the layer (A). Usually, however, the same polyolefin resin is used in preparation of both the layers (A) and (B).

Inorganic fillers which can be used in the layer (B) include talc, titanium oxide, calcium carbonate, magnesium carbonate, kaolin, clay, calcium sulfite, aluminum hydroxide, barium sulfate, and mixtures thereof. Particularly preferred are talc and a mixture of talc and titanium oxide.

Talc is not limited in type, shape, size, and so forth. Various types of talc as described in the first embodiment can be used. This talc used as the inorganic filler for the layer (B) may be the same as or different from that used in the layer (A).

Titanium oxide, which is to be used in combination with talc as the inorganic filler, is also not limited in shape, for example. This titanium oxide may be the same as or different from that used in the layer (A).

The layer (B) is made of the polyolefin resin and from 0 to 10% by weight of the inorganic filler. That is, the layer (B) is prepared by applying the polyolefin resin alone or by adding the inorganic filter to the polyolefin resin in a proportion of 10% by weight or less, kneading the resulting mixture, and then applying it.

By adjusting the proportion of the inorganic filler to 10% by weight or less, when the layer (B) is provided so as to be an outer layer of the cup, beautiful prints can be produced on the surface of the cup stably for long periods of time.

In the second embodiment, it is sufficient that the laminated sheet be composed of the layers (A) and (B). Any of the layers (A) and (B) may be used as an outer layer. It is to be noted that the laminated sheet is not limited only to a two-layer structure, but includes a multi-layer structure. That is, the laminated sheet may be composed of a plurality of layers. Even in this two-layer structure, if the layer (B) is used an outer layer, beautiful prints can be produced on the surface of the cup stably for long periods of time. In a case that the cup of the present invention is used particularly as a cup for soft drinks, if the inner layer of the cup is made of a polyolefin resin composition with a large amount of inorganic filler compounded thereto, carbon dioxide gas becomes easily consumable. For this reason, in the case of the two-layer structure, it is preferred that the layer (B) be used as an inner layer. Therefore, it is preferred to employ a three-layer structure sheet comprising the layer (B) as an inner layer, the layer A as an intermediate layer, and the layer (B) as an outer layer. That is, in this structure, the layer (A) is sandwiched between the two layers (B) and (B). Particularly preferred is a three-layer structure sheet in which the layer (A) is sandwiched between the layers (B) and (B) made of a polyolefin resin composition not containing an inorganic filler.

In the second embodiment, as in the first embodiment, the polyolefin resin composition for each layer may further contain rubbers such as an ethylene/propylene rubber and an ethylene/propylene/diene rubber, polyolefin resins modifed with unsaturated carboxylic acids such as maleic anhydride or their derivatives, and so forth. In addition, various additives such as antioxidants, ultraviolet absorbers, antistatic agents, lubricants, and pigments can be added. In the structure where the layer (B) is used as an inner layer, the polyolefin resin composition of the layer (A) can be added inorganic filler other than talc and titanium oxide. As those inorganic filler, calcium carbonate, magnesium carbonate and barium sulfate can be used.

In the second embodiment, the ratio of the thickness of the layer (A) to that of the layer (B) is not critical and can be determined appropriately according to the type and amount of each of the polyolefin resin and inorganic filler, and so forth. In the case of a two-layer structure sheet comprising the layer (A) as an inner layer and the layer (B) as an outer layer, the ratio in thickness of the inner layer to the outer layer is usually from 98:2 to 70:30 and preferably from 97:3 to 80:20. In this case, if the layer (B) as an outer layer is made of a polyolefin resin not containing an inorganic filler, it is necessary to decrease the foregoing thickness ratio in order to maintain a high quality impression. The average wall thickness of the cup is from about 0.3 to 0.8 millimeter.

In the second embodiment, the cup is made using a laminated sheet composed basically of the layers (A) and (B). If necessary, one or more layers may be further laminated. For example, between the layers (A) and (B) may be sandwiched a layer of an adhesive resin such as an ethylene/vinyl acetate copolymer saponified product, nylon, polyethylene terephthalate, and an unsaturated carboxylic acid-modified polyolefin.

In the second embodiment, the laminated sheet comprising the layers (A) and (B) is formed by techniques such as the T-die process and then further subjected to thermal thermoforming such as vacuum forming or pressure forming to produce the cup of the present invention.

In the second embodiment, there is no limitation to the shape of the cup. It can be formed in the same shape as in the first embodiment.

Figure 2:
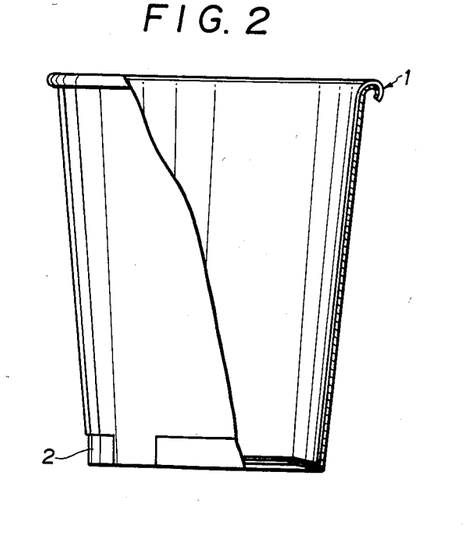
FIGS. 2 and 3 are partially cutaway front views of other embodiments of the cup of the present invention.

Usually the cup is suitable to be designed in a shape as shown in FIG. 2 which can be used as a cup for drinks.

The cup of the present invention has a high quality paper-like appearance and, furthermore, the surface of the cup is rarely stained.

The cup of the second embodiment is very superior in formability, particularly in thermoformability for the production of deep cups since an at least two-layer structure laminated sheet is used in the production thereof and, furthermore, it is superior in dimensional stability. Moreover, the stiffness and strength as a cup are satisfactory and the environmental stress crack resistance (ESCR) is also high. When the layer (B) is used as an outer layer, irregularties are less formed in the surface of the cup at the time of forming thereof. Therefore, when the cup surface is printed, beautiful prints freed of unevenness and blurring can be produced over long periods of time.

Thus the cup of the second embodiment is useful not only as a drink cup to be used in a vending machine but also as a cup for various foodstuffs.

As described above, there is no special limitation to the shape of the cup of the present invention. If, however, the cup of the present invention is produced in shapes as described hereinafter, the following additional benefits can be obtained; (1) storage stability in a superposed state is excellent, (2) it is difficult to fall down, (3) it is ensured that the cups drop one by one, and (4) dropping properties are good. Thus the resulting cup is suitable as a drink cup to be used in a vending machine. These specific forms will hereinafter be explained with reference to FIGS. 3 and 4.

Figure 3:
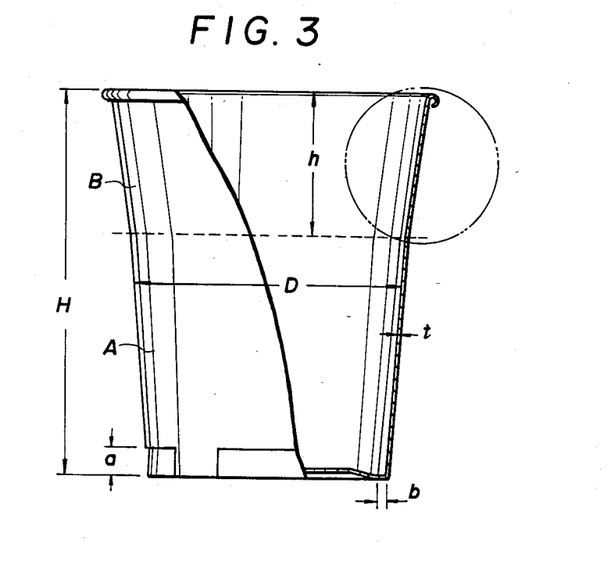
Figures 4, 5A, 6:
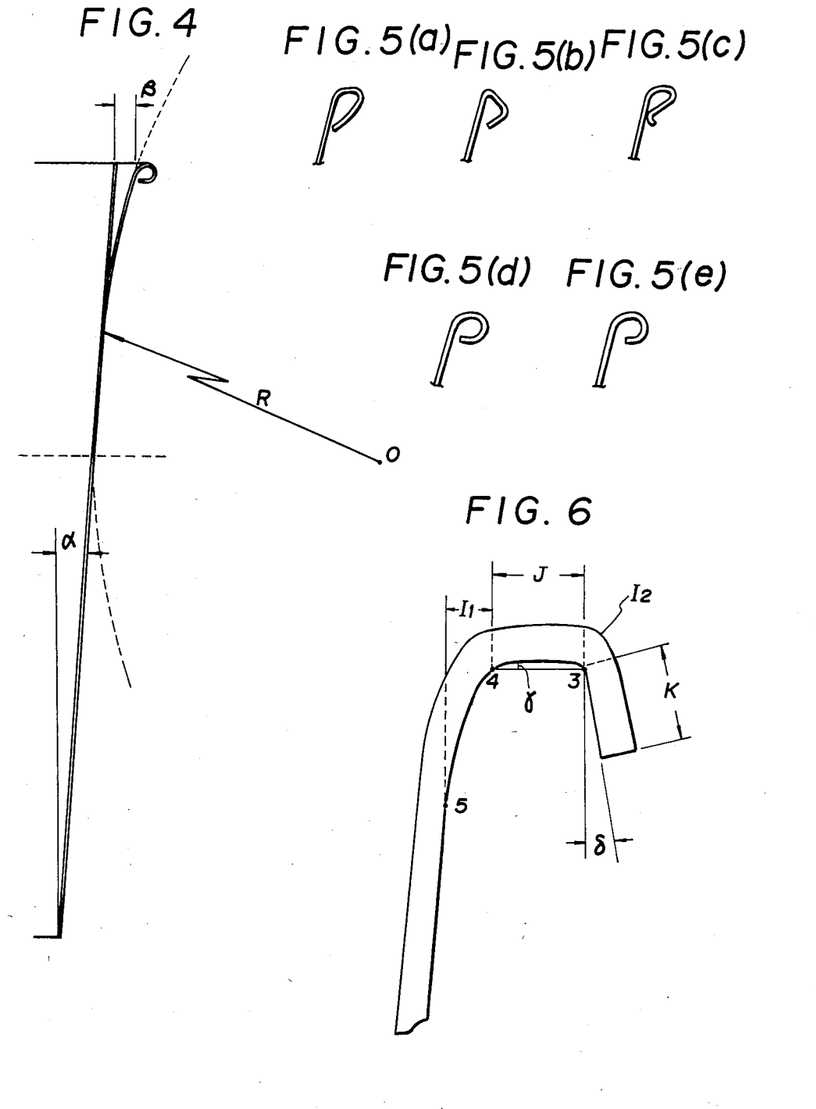
FIG. 4 is an enlarged cross sectional view of the wall of the cup of FIG. 3.
FIG. 6 is a cross-sectional view illustrating an embodiment of an outward-bent rib at an open end of the cup of the present invention.

Referring to FIG. 4, there is shown an enlarged cross sectional view of the wall of the cup of FIG. 3. This wall can be divided into two sections: one is from the bottom to an intermediate point and the other from the intermediate point to the top. For convenience of explanation, a lower part of the cup corresponding to the former section is called a part (1) and an upper part of the cup corresponding to the latter section is called a part (2). In the part (1), the wall is tapered at an angle indicated by the symbol $\alpha$ in FIG. 4. The angle $\alpha$ should be from 3° to 10°, with the range of from 4° to 8° being preferred. If the angle $\alpha$ is less than 3°, the drink cups cannot be superposed on one another in a regular condition with a stack height indicated by the symbol a. On the other hand, if the angle $\alpha$ is in excess of 10°, when a number of cups (for example, 100 cups) are superposed, they are liable to lean to one side and, therefore, are not suitable for use in a vending machine.

The wall of the paper (2) is tapered in such a manner that the radius R is from 20 to 300 millimeters and preferably from 30 to 250 millimeters and, furthermore, that a deviation from an extended line of the wall of the part (1) to the edge of the part (2), which is indicated by the symbol $\beta$, is from 0.3 to 2 millimeters are preferably from 0.5 to 1.5 millimeters. If the radius R is less than 20 millimeters, stacking properties and stable and sure dropping properties are reduced by the influence of heating at the time of curling treatment and so forth. On the other hand, if it is in excess of 300 millimeters, when a number of cups are superposed on one another, they are undesirably liable to fall to one side. It is not always required for the arc of the radius R to be in a line contact with the extended line of the wall of the part (1). If the deviation $\beta$ is less than 0.3 millimeters, the cups superposed on one another do not drop by themselves. On the other hand, if it is in excess of 2 millimeters, when the cups are superposed, they more easily lean to one side.

The height of the part (2) is not critical. Usually it is controlled to be from 1/10 to 3/5, preferably from ⅛ to ½ the total height H of the cup.

One of the features of the present invention is that the cup is produced so as to be composed of the parts (1) and (2) as described above. Thus there can be obtained cups which are superior in dropping properties, superposing properties, and so forth, and which are difficult to lean to one side when superposed on one another.

Another feature is that the periphery of the open end is subjected to a curling treatment. This treatment is applied to increase the strength of the open top end of the cup and also to improve characteristics required for a drink cup; for example, no injury of hands or lips in use. The curling treatment can be applied in any desired shape. In order to increase the strength of the cup, and also in order that the cups can drop surely one by one when used in a vending machine, the forms of curl as shown by (d) and (e) of FIG. 5, which have a flat portion at the bottom thereof, are advantageous to use over the shapes of curl as shown by (a), (b) and (c).

Drink cups having these good shapes of curling are difficult to produce by the usual curling treatment since the forming temperature is relatively high and stiffness drops abruptly at the forming temperature. By employing a shape as described hereinafter, drink cups having such a good shape of curling can be produced easily by applying the usual curling treatment. That is, as shown in FIG. 6, there is used a drink cup in which the outward-bent edge or U-shaped rim of the open top end of the drink cup is composed of a first bent portion $I_1$, a horizontal portion J, a second bent portion $I_2$, and a top portion K, the relation between the length of the top portion K and that of the horizontal portion J is such that $K=(1\pm0.3)\times J$, and the angle $\delta$ at which the top portion K is bent is controlled so that $\delta=5°\pm3°$. The symbol J indicates the distance from a point 3 to a point 4 and is usually from about 0.5 to 3.0 millimeters. The symbol $\delta$ indicates the angle between a vertical at the point 3 and the inner surface of the top portion K. If the values of the top portion K and angle $\delta$ are not within the above-specified ranges, there cannot be obtained a desirable shape of curl when a curling treatment is applied. Thus the drink cup is poor in self-dropping characteristics when used in a vending machine and thus is of no practical value.

The U-shaped rim is desired to be formed as follows:

The distance from a point 4 to a point 5, which is a length of a flat zone of the first bent portion $I_1$, is $(0.4\pm0.2)\times J$. The symbol $\gamma$ indicates an angle between a vertical at a point 4 and the inner surface of the horizontal portion J. The angle $\gamma$ is from 0° to 30° and preferably from 0° to 10°.

The symbol (b) indicates the bottom edge of the cup, and said edge is a portion which contacts with the horizontal plane such as the table when the cup is put thereon. The symbol (b) is preferably formed in as small size as possible. It is usually from 1 to 5 millimeters and preferably 2 millimeters or less.

Cups having a shape as described above can be produced by applying the usual curling treatment such as by the use of a three-roll type curling apparatus. They are superior in dropping properties and are suitable as drink cups for use in a vending machine.

From a viewpoint of production, the present invention offers advantages in that the thermoformability, particularly releasing properties of the cup is superior and punching of the cup from a sheet is good.

As described above in detail, the cup of the present invention has a high quality appearance, equal or superior to that of a paper cup, which would not be expected from a cup made of plastics and, furthermore, is freed of the problem of formation of print deviation in the surface printing thereof since there is no bonded part as in a cup made of paper. One of the major features of the present invention is that, if necessary, the shape of the cup can be changed arbitrarily.

The cup of the present invention can be massproduced continuously by a procedure involving sheet molding, thermoforming, and printing. Thus the present invention is advantageous from a viewpoint of production costs. Another feature of the present invention is that the cup of the present invention has an appearance completely different from those of conventional plastic cups; that is, it is of high whiteness, is opaque, and is of low luster. In addition, the cup of the present invention is greatly improved in disposability and ease of disposal by burning. Thus it is very useful as a cup which is consumed in a large quantity.

Accordingly the cup of the present invention can be used as a cup for foodstuffs such as ice cream, ices, and jelly and also as a cup for various drinks. In particular, a drink cup with an open end portion subjected to a curling treatment is usable as a cup for a picnic, a party, or for home. Furthermore, in view of its superior self-dropping characteristics and disposability, it can be used in a large quantity as a cup for drinks, hot or cold, as sold by a vending machine.

The present invention is described in greater detail with reference to the following examples, although the present invention is not intended to be limited thereto.

EXAMPLES 1 TO 4

A polyolefin resin, talc and titanium oxide as shown in Table 1 were kneaded in a Banbury mixer, pelletized and, thereafter, molded into a sheet measuring 700 millimeters in width and 1 millimeter in thickness by the use of an extruder. The physical properties of this sheet are shown in Table 1. The sheet was vacuum and pressure formed to produce a cup in which the diameter was 70 millimeters, the height was 90 millimeters, the thickness of the bottom was 0.85 millimeter, and the thickness of the side walls was 0.36 millimeters. The physical properties of the cup are shown in Table 1.

COMPARATIVE EXAMPLE 1

A cup was produced in the same manner as in Examples 1 to 4 except that titanium oxide was not added. The results are shown in Table 1.

TABLE 1

|  | Run No. | | | | |
|---|---|---|---|---|---|
|  | Example 1 | Example 2 | Example 3 | Example 4 | Comparative Example 1 |
| Composition (wt %) | | | | | |
| Polyolefin Resin | | | | | |
| Polypropylene (homopolymer)*1 | 20 | 20 | 30 | 0 | 20 |
| Polypropylene (blockcopolymers)*2 | 0 | 0 | 0 | 60 | 0 |
| High density polyethylene*3 | 30 | 30 | 20 | 0 | 30 |
| Talc*4 | 48 | 46 | 36 | 36 | 50 |
| Titanium oxide | 2 | 4 | 4 | 4 | 0 |
| Physical Properties of Sheet | | | | | |
| Tensile Strength*5 | 272 | 274 | 283 | 243 | 270 |
| Elongation*5 | 8 | 8 | 15 | 70 | 7 |
| Tensile Modulus*5 | 23,000 | 23,000 | 20,500 | 21,000 | 23,000 |
| Whiteness degree*6 | 92.2 | 94.2 | 93.6 | 94.4 | 83.1 |
| Glossiness*7 | 40.2 | 35.6 | 37.0 | 36.0 | 52.0 |
| Total Transmittance (%)*8 | 1.4 | 0 | 0 | 0 | 30.4 |
| Physical Properties of cup | | | | | |
| Whiteness degree*6 | 92.0 | 94.8 | 94.2 | 94.4 | 83.0 |
| Glossiness*7 (GS (60°)) | 6.5 | 5.7 | 5.4 | 5.3 | 12.0 |
| Total Transmittance of Bottom (%)*8 | — | 0.6 | — | — | — |
| Total Transmittance of Side Wall (%)*8 | — | 6.3 | — | — | — |

*1Density, 0.91 gram per cubic centimeter; melt index, 0.6 gram per 10 minutes
*2Density, 0.90 gram per cubic centimeter; melt index, 1.0 gram per 10 minutes
*3Density, 0.964 gram per cubic centimeter; melt index, 0.4 gram per 10 minutes
*4Mean grain size, 15 microns
*5Measured according to JIS K6734.
*6Measured according to JIS K7103.
*7Measured according to ASTM D523.
*8Measured according to ASTM D1003.

the bottom as determined according to ASTM D1003 was 0.6%, the thickness of the periphery was 0.36 millimeter, and the transmittance of the periphery was 6.3%. This drink cup had a high quality paperlike appearance and created the impression of high quality. For the drink cup, the buckling strength was 19.5 kilograms, the compression strength of the side walls was 145 grams, the whiteness degree of the outer surface of the cup was 94.3%, and the glossiness (GS (60°)) was 6.0%.

Water at 25° C. was placed in the drink cup. Ten minutes after the introduction of water, the buckling strength was 18.5 kilograms and the side wall compression strength was 160 grams. Even when the cup was soaked in hot water maintained at 95° C. for 10 minutes, no abnormality was observed. The calorific value of the drink cup was 5,430 calories per gram, which was very low as compared with 9,860 calories per gram of a cup made of high impact polystyrene (HIPS) and which was close to 4,500 calories per gram of a paper cup.

COMPARATIVE EXAMPLE 2

EXAMPLE 5

A mixture of 25% by weight of a propylene homopolymer (density, 0.91 gram per cubic centimeter; melt index, 0.6 gram per 10 minutes), 25% by weight of high density polyethylene (density, 0.964 gram per cubic centimeter; melt index, 0.4 gram per 10 minutes), 46% by weight of talc (mean grain size, 15 microns), and 4% by weight of titanium oxide was melt-kneaded in a Banbury mixer, pelletized and, thereafter, formed into a 1-millimeter thick sheet by the use of an extruder. Then the sheet was thermoformed into a cup (height, 90 millimeters; average diameter, 60 millimeters) by the use of vacuum and pressure thermoforming machine (pressure; 6 kilograms per square centimeter). A heat curling treatment was applied onto the periphery of the open top end of the cup to produce a drink cup as shown in FIG. 1.

For the thus-produced drink cup, the thickness of the bottom was 0.85 millimeter, the total transmittance of For a commercially available high quality papermade drink cup, the buckling strength was 44 kilograms, the side wall compression strength was 130 grams, the whiteness degree of the outer surface of the cup was 92%, and the glossiness (GS (60°)) was 9.5%. Ten minutes after the introduction of water at 25° C. into the cup, the buckling strength was 19 kilograms, the side wall compression strength was 70 grams, and water resistance was not sufficiently satisfactory. When the cup was soaked in hot water maintained at 85° C. for 5 minutes, the curling portion and bonded sections were deformed by swelling.

COMPARATIVE EXAMPLE 3

When a drink cup made of HIPS was soaked in hot water maintained at 90° C. for 5 minutes, the open top end of the cup was deformed; that is, the diameter was decreased from 81 millimeters to 75 millimeters.

EXAMPLE 6

A cup (height, 90 millimeters; average diameter, 60 millimeters; thickness of bottom, 0.85 millimeter; thickness of periphery, 0.36 millimeter) was produced in the same manner as in Example 5 except that the proportions of the propylene homopolymer and high density polyethylene compounded were changed to 20% by weight and 30% by weight, respectively.

For the cup, the whiteness degree of the central portion of the outer surface was 94%, the glossiness (GS (60°)) was 5.6%, the total transmittance of the bottom was 0.6 percent, and the total transmittance of the periphery was 6.3%. This drink cup had a high quality paper-like appearance and created the impression of high quality. The buckling strength was 19.5 kilograms and the side wall compression strength was 145 grams.

EXAMPLES 7 TO 11, AND COMPARATIVE EXAMPLES 4 TO 6

Using resins and layer ratios as shown in Table 2, two-layer or single layer sheets (thickness, 1.2 millimeters; width, 500 millimeters) were molded by the use of a co-extrusion T-die sheet production apparatus. Each sheet was thermoformed into a cup (diameter of open top end, 75 millimeters; diameter of bottom, 50 millimeters; height, 80 millimeters) at a temperature of 150 degrees centigrade by the use of a continuous vacuum and pressure thermoforming machine.

The cup was measured for stiffness, appearance (paper-like feeling), and printability. The results are shown in Table 2.

TABLE 2

| Run No. | Inner Layer (wt. %) | | | | Outer Layer (wt %) | | | | Layer Ratio (Inner Layer/ Outer Layer) | Stiffness*4 (g) | Appearance*5 (Paper-Like Feeling) | Printability*6 |
|---|---|---|---|---|---|---|---|---|---|---|---|---|
| | PP*1 | PE*2 | Talc*3 | Titanium Oxide | PP*1 | PE*2 | Talc | Titanium Oxide | | | | |
| Example 7 | 25 | 25 | 46 | 4 | 50 | 50 | — | — | 9/1 | 105 | | >30,000 |
| Example 8 | 25 | 25 | 46 | 4 | 45 | 50 | 5 | — | 9/1 | 110 | | >30,000 |
| Example 9 | 25 | 25 | 46 | 4 | 50 | 50 | — | — | 19/1 | 120 | | >30,000 |
| Example 10 | 25 | 25 | 46 | 4 | 45 | 50 | 5 | — | 19/1 | 120 | | >30,000 |
| Example 11 | 25 | 25 | 46 | 4 | 45 | 50 | 4.5 | 0.5 | 9/1 | 110 | | >30,000 |
| Comparative Example 4 | 25 | 25 | 50 | — | — | — | — | — | — | 120 | | 700 |
| Comparative Example 5 | 30 | 50 | 20 | — | — | — | — | — | — | 95 | | 3,000 |
| Comparative Example 6 | 25 | 25 | 50 | — | 35 | 50 | 15 | — | 9/1 | 90 | | 8,000 |

*1 Propylene homopolymer (density, 0.91 gram per cubic centimeter; melt index, 0.5 gram per 10 minutes)
*2 High density polyethylene (density, 0.964 gram per cubic centimeter; melt index, 0.4 gram per 10 minutes)
*3 Mean grain size, 13 microns
*4 Load applied when the cup is pressed in the state that it is laid on its side.
*5 Evaluated in terms of surface gloss.
*6 The central portion of the side wall of the cup is printed in a width of 60 millimeters by the use of a curved surface printing machine. Printability are indicated in terms of the number of prints till unevenness and blurr occur on the printed surface of the cup.

EXAMPLES 12 TO 15

Using resins and layer ratios as shown in Table 3, multi-layer sheets measuring 1.2 millimeters in thickness and 50 millimeters in width were produced by the use of a co-extrusion T-die sheet production apparatus. These sheets were thermoformed at a temperature of 150° C. by the use of a vacuum pressure thermoforming machine to produce the corresponding drink cups in which the diameter of the open top end was 75 millimeters, the diameter of the bottom was 50 millimeters, and the height was 80 millimeters. Then, a curling treatment was applied by the use of a three-roll type continuous curling machine to produce drink cups of the shape as shown in FIG. 2.

These cups were measured for stiffness, appearance (paper-like feeling), printability, and soft drink properties. The results are shown in Table 3.

TABLE 3

| Run No. | Inner Layer (wt %) | | Outer Layer (wt. %) | | | | | | Layer Ratio (Inner Layer/ Outer Layer/ Outermost Layer) | Stiffness*4 (g) | Appearance*5 (paper-like feeling) | Printability*6 | Soft Drink*7 properties |
|---|---|---|---|---|---|---|---|---|---|---|---|---|---|
| | PP*1 | PE*2 | PP*1 | PE*2 | Talc*3 | Titanium Oxide | PP*1 | PE*2 | | | | | |
| Example 12 | 50 | 50 | 25 | 25 | 46 | 4 | — | — | 1/ 9/0 | 105 | | Δ | |
| Example 13 | 50 | 50 | 25 | 25 | 46 | 4 | — | — | 1/19/0 | 120 | | Δ | |
| Example 14 | 60 | 40 | 30 | 20 | 46 | 4 | 60 | 40 | 1/19/1 | 125 | | | |
| Example 15 | 40 | 60 | 20 | 30 | 46 | 4 | 40 | 60 | 1/ 9/1 | 108 | | | |

*1 Propylene homopolymer (density, 0.91 gram per cubic centimeter; melt index, 0.5 gram per 10 minutes)
*2 High density polyethylene (density, 0.964 gram per cubic centimeter; melt index, 0.4 gram per 10 minutes)
*3 Mean grain size, 13 microns
*4 Load applied when the central portion of the cup is pressed in the state it is laid on its side.
*5 Evaluated in terms of surface gloss.
*6 The central portion of the side wall of the cup is printed in a width of 60 millimeters by the use of a curved surface printing machine. Printability are evaluated by performing a continuous printing operation.
*7 A soft drink is injected into the cup, and the soft drink properties are evaluated by its ability to hold carbon dioxide gas.

What is claimed is:

1. A cup produced by thermoforming of a polyolefin resin composition sheet, wherein said polyolefin resin is a mixture of polypropylene resin and high density polyethylene resin in a weight ratio of from 9:1 to 1:9, wherein said polyolefin resin composition comprises from 30 to 80% by weight of a polyolefin resin, from 19 to 69% by weight of talc, and from 1 to 10% by weight of titanium dioxide, wherein the ratio of height to average diameter as average edge length is 1.1:1 to 2.0:1.

2. The cup as claimed in claim 1, wherein the major portion of the outer surface of the cup has a whiteness degree of at least 90% and a glossiness, GS (60°), of 10% or less.

3. The cup as claimed in claim 1, wherein the ratio of height to average diameter is 1.1:1 to 2.0:1 and the periphery of the open top end is subjected to a curling treatment.

4. The cup as claimed in claim 1, as a cup for use in a vending machine.

5. The cup as claimed in claim 1, wherein said polyolefin resin is a polypropylene resin having a melt index of from 0.1 to 5 grams per 10 minutes.

6. The cup as claimed in claim 1, wherein said polyolefin resin is a polyethylene resin having a melt index of from 0.02 to 10.0 grams per 10 minutes.

7. The cup as claimed in claim 1, wherein said talc is highly purified or freed of impurities by application of acid treatment.

8. The cup as claimed in claim 1, wherein said talc is surface treated to make it lipophilic.

9. The cup as claimed in claim 1, wherein said titanium oxide has an average grain size of from about 0.05 to 2 microns.

10. The cup as claimed in claim 1, wherein said ratio of polypropylene resin to high density polyethylene resin is from 7:3 to 3:7.

11. A cup produced by thermoforming a laminated sheet comprising (A) a layer of a polyolefin resin composition comprising from 30 to 80% by weight of a polyolefin resin, from 19 to 69% by weight of talc, and from 1 to 10% by weight of titanium oxide, and (B) a layer of a polyolefin resin composition containing from 0 to 10% by weight of an inorganic filler; said polyolefin resin in each of layers (A) and (B) is a mixture of polypropylene resin and high density polyethylene resin in a weight ratio of From 9:1 to 1:9.

12. The cup as claimed in claim 11, wherein said polyolefin resin in layer (A) and said polyolefin resin in layer (B) are the same.

13. The cup as claimed in claim 11, wherein said inorganic filler is present in layer (B) and is at least one selected from the group consisting of talc, titanium oxide, calcium carbonate, magnesium carbonate, kaolin, clay, calcium sulfite, aluminum hydroxide and barium sulfate.

14. The cup as claimed in claim 13, wherein said inorganic filler is talc or a mixture of talc and titanium oxide.

15. The cup as claimed in claim 11, wherein layer (B) is the inner layer and layer (A) is the outer layer.

16. The cup as claimed in claim 11, wherein said ratio of polypropylene resin to high density polyethylene resin is from 7:3 to 3:7.

17. A cup produced by thermoforming a laminated sheet comprising an intermediate layer (A) of a polyolefin resin composition comprising from 30 to 80% by weight of a polyolefin resin, from 19 to 69% by weight of talc, and from 1 to 10% by weight of titanium oxide, an inner layer (B) and an outer layer (C) each layer (B) and (C) being of a polyolefin resin composition containing from 0 to 10% by weight of an inorganic filler; said polyolefin resin in each of layers (A), (B) and (C) is a mixture of polypropylene resin and high density polyethylene resin in a weight ratio of from 9:1 to 1:9.

18. The cup as claimed in claim 17, wherein said polyolefin resin in said outer layer (C) is a mixture of polypropylene resin and polyethylene resin.

19. The cup as claimed in claim 18, wherein said polyolefin resin in each of layers (A), (B) and (C) is a mixture of polypropylene resin and polyethylene resin.

20. The cup as claimed in claim 17, wherein said ratio of polypropylene resin to high density polyethylene resin is from 7:3 to 3:7.

* * * * *